United States Patent
Kim et al.

(10) Patent No.: US 7,640,635 B2
(45) Date of Patent: Jan. 5, 2010

(54) FIXING CLIP FOR INTERIOR PART OF VEHICLE

(75) Inventors: Hwi Woo Kim, Suwon-si (KR); Hwa Sik Kim, Suwon-si (KR)

(73) Assignee: NVH Korea Inc., Ulsan (KR)

(*) Notice: Subject to any disclaimer, the term of this patent is extended or adjusted under 35 U.S.C. 154(b) by 0 days.

(21) Appl. No.: 11/977,285

(22) Filed: Oct. 24, 2007

(65) Prior Publication Data

US 2008/0289155 A1   Nov. 27, 2008

(30) Foreign Application Priority Data

May 23, 2007   (KR) .................... 10-2007-0050550

(51) Int. Cl.
*A44B 21/00* (2006.01)
*F16B 5/12* (2006.01)

(52) U.S. Cl. ........................................... 24/295

(58) Field of Classification Search ........... 24/289–295, 24/297; 411/508–511, 45–48, 182, 480, 411/533, 902, 903, 349, 173–175, 112, 913; 403/397, 408.1, 326; 52/716.7, 718.06, 716.5, 52/716.6, 716.8, 718.03, 714; 174/138 D
See application file for complete search history.

(56) References Cited

U.S. PATENT DOCUMENTS

| | | | |
|---|---|---|---|
| 6,629,809 B2* | 10/2003 | Vassiliou | 411/173 |
| 6,644,713 B2* | 11/2003 | Del Pozo Abejon et al. | 296/39.1 |
| 7,086,125 B2* | 8/2006 | Slobodecki et al. | 24/295 |
| 2001/0032377 A1* | 10/2001 | Lubera et al. | 24/293 |
| 2002/0100146 A1* | 8/2002 | Ko | 24/295 |
| 2002/0167187 A1* | 11/2002 | Murar | 296/39.1 |
| 2006/0168773 A1* | 8/2006 | Smith et al. | 24/295 |

* cited by examiner

*Primary Examiner*—James R Brittain
(74) *Attorney, Agent, or Firm*—Ladas and Parry LLP

(57) ABSTRACT

A fixing clip for fixing an interior part of a vehicle is provided. The fixing clip is assembled in a body with the interior part via a headlining by a screw and is fixed to a mounting bracket provided in a vehicle body. The fixing clip includes a bottom part provided with a screw hole through which the screw is fastened and being in close contact with an upper surface of the interior part, a pair of body parts extending and being bent upwardly from both ends of the bottom part to face each other, and a pair of coupling parts extending and being bent outwardly and downwardly from upper ends of the body parts and being inserted into clip insertion holes provided on the mounting bracket. Accordingly, the clip can firmly and easily mount/separate an interior part on/from the vehicle body with its deformation, damage, or unexpected seceding due to an external force prevented.

6 Claims, 5 Drawing Sheets

FIXING CLIP FOR INTERIOR PART OF VEHICLE

CROSS-REFERENCE TO RELATED APPLICATION

This application is based on and claims priority from Korean Patent Application No. 10-2007-50550, filed on May 23, 2007 in the Korean Intellectual Property Office, the disclosure of which is incorporated herein in its entirety by reference.

BACKGROUND OF THE INVENTION

1. Field of the Invention

The present invention relates to a fixing clip for an interior part of a vehicle, and more particularly, to a fixing clip for fixing an interior part of a vehicle, such as a sun-visor, an assist handle, a room lamp, or the like, to a body of the vehicle.

2. Description of the Prior Art

Generally, on the headlining of a vehicle, a sun-visor for shielding the light, an assist handle for seeking passenger's stable driving environments, a room lamp for interior illumination, and so forth, are installed. Such parts are not directly fixed to the headlining, but are typically coupled to both the headlining and a support frame connected to a body frame using a bolt, simultaneously with the mounting of the headlining on the support frame.

Accordingly, their mounting work is complicated and a lot of working time is required, so that the productivity is decreased. To solve these problems, a clip for facilitating the mounting of the part on a structure has been used. As a prior art, Korean Patent Registration No. 10-0490599 (registered on May 11, 2005) "clip for mounting an article" has been disclosed. As illustrated in FIG. 1, this clip 10 includes a plate type base member having a fastening hole formed thereon to fasten an article, a pair of flanges formed at both end portions of the base member to horizontally extend against a length direction of the base member, a pair of insertion parts for being bent and extending upward from both edges of the base member so that the insertion parts face each other and become in contact with each other, and a pair of hook plates downwardly cut and projected approximately from center regions of the insertion parts to be elastically urged to an outside, and provided with free ends having stepped parts each of which is formed on the free end and has an inwardly bent portion and an outwardly bent portion. The respective hook plate further include a pair of wing parts downwardly projected from both edges of the free end, and the front end of the wing part is approximately at the same height as a connection portion of the inwardly bent portion and the outwardly bent portion of the stepped part.

The conventional clip as described above, however, has problems that it is deformed or damaged, or secedes from its original mounted position by an external force being applied to the insertion parts or the hook plates.

SUMMARY OF THE INVENTION

Accordingly, the present invention has been made to solve the above-mentioned problems occurring in the prior art while advantages achieved by the prior art are maintained intact.

One object of the present invention is to provide a fixing clip for an interior part of a vehicle which can be firmly and easily mounted on or separated from a mounting bracket, with its deformation or damage due to an external force prevented.

In order to accomplish this object, there is provided a fixing clip for an interior part of a vehicle that is assembled in a body with the interior part via a headlining by a screw and is fixed to a mounting bracket provided in a vehicle body, according to the present invention, which includes a bottom part provided with a screw hole through which the screw is fastened and being in close contact with an upper surface of the interior part; a pair of body parts extending and being bent upwardly from both ends of the bottom part to face each other; and a pair of coupling parts extending and being bent outwardly and downwardly from upper ends of the body parts and being inserted into clip insertion holes provided on the mounting bracket.

In one embodiment of the present invention, a space is formed in each of the body parts, and a deformation prevention piece is formed in a body with the body part to project from the body part.

In one embodiment of the present invention, a cut portion is formed in the coupling part, and an elastic wing part that is elastically biased to an outside is formed in a body with the coupling part.

In one embodiment of the present invention, an inwardly bent portion and an outwardly bent portion are formed at a front end of the elastic wing part, and a front end of the outwardly bent portion is projected downward from the clip insertion hole.

In one embodiment of the present invention, at an end of the respective coupling part, a flange which extends to be bent to an outside and is elastically biased to a lower surface of the mounting bracket is formed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
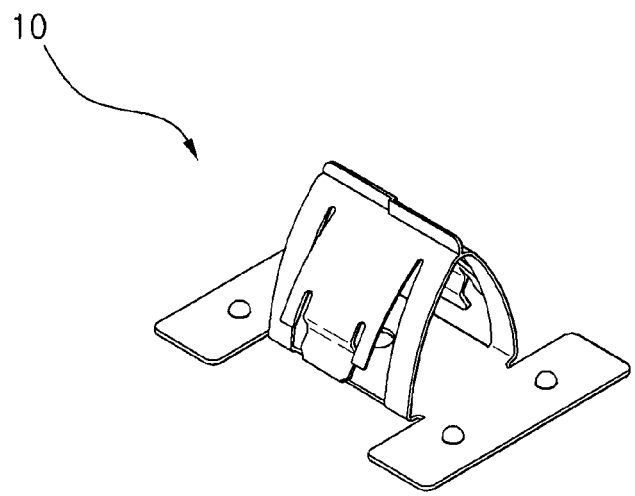
FIG. 1 is a perspective view of a conventional fixing clip for an interior part of a vehicle.
Figure 2:
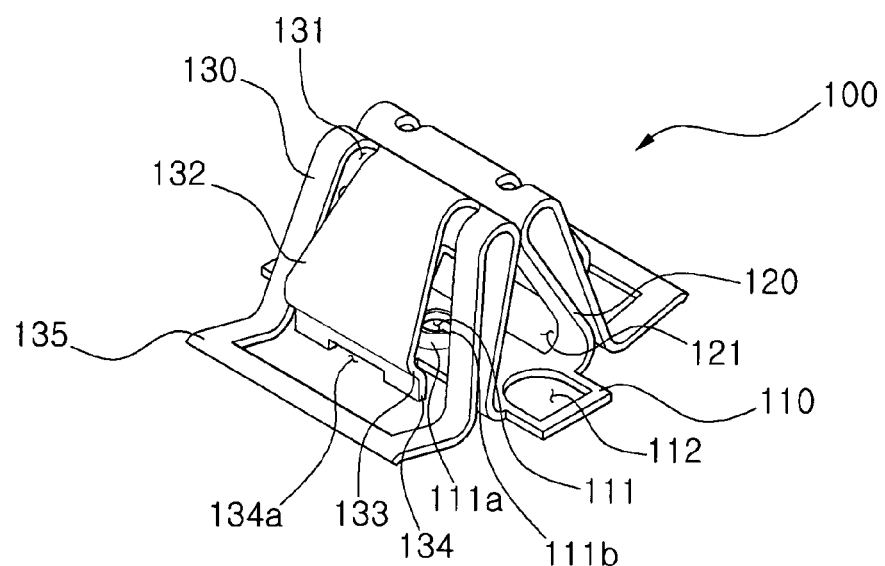
FIG. 2 is a perspective view of a fixing clip for an interior part of a vehicle according to an embodiment of the present invention.
Figure 3:
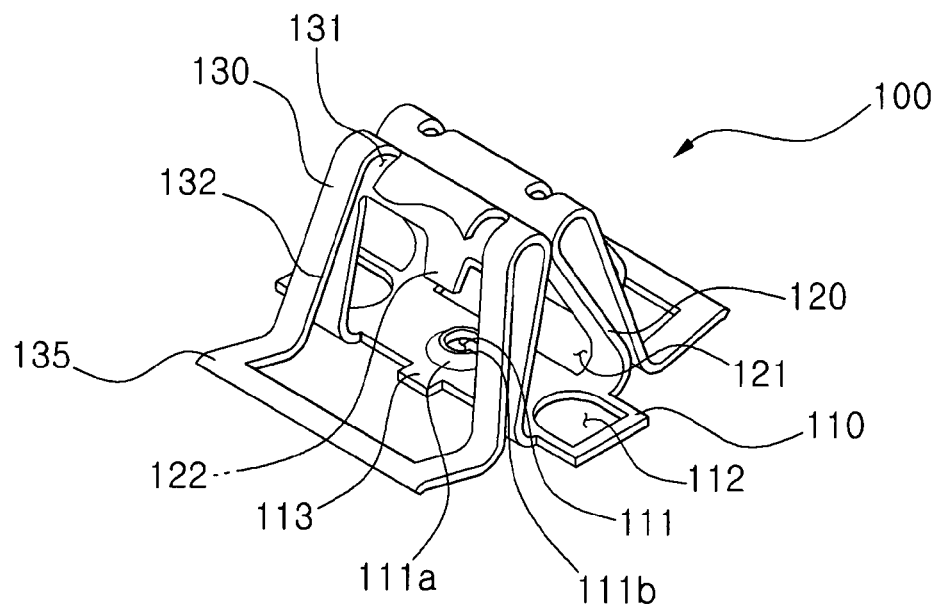
FIG. 3 is a partially cut-out view of FIG. 2.
Figure 4A:
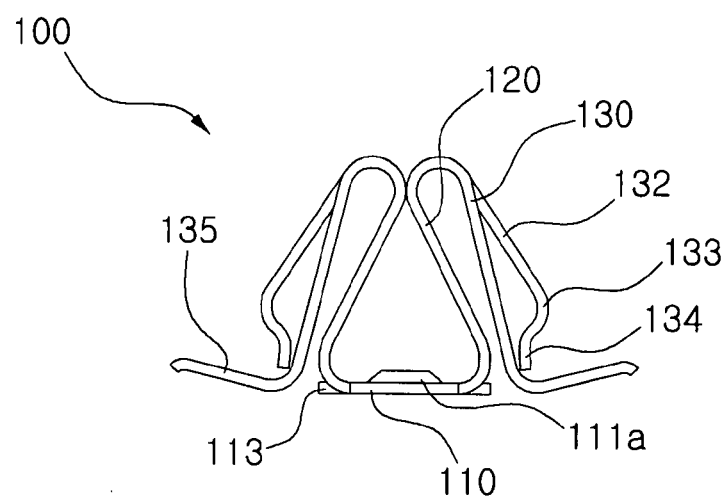
FIG. 4A is a side view of a fixing clip for an interior part of a vehicle according to an embodiment of the present invention.
Figure 4B:
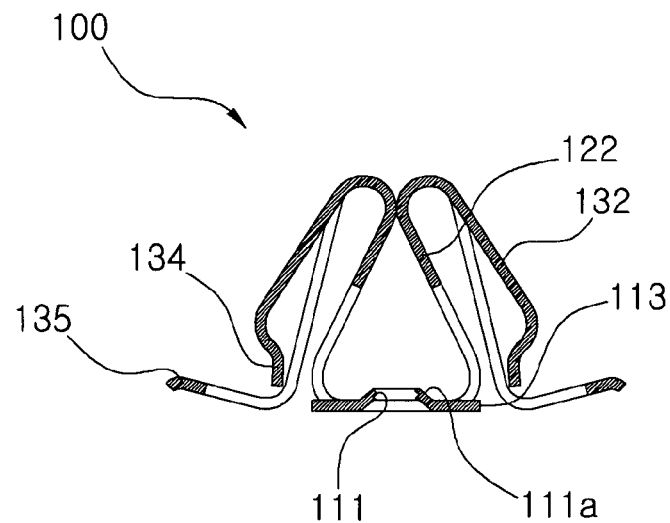
FIG. 4B is a sectional view of a fixing clip for an interior part of a vehicle according to an embodiment of the present invention.
Figure 5:
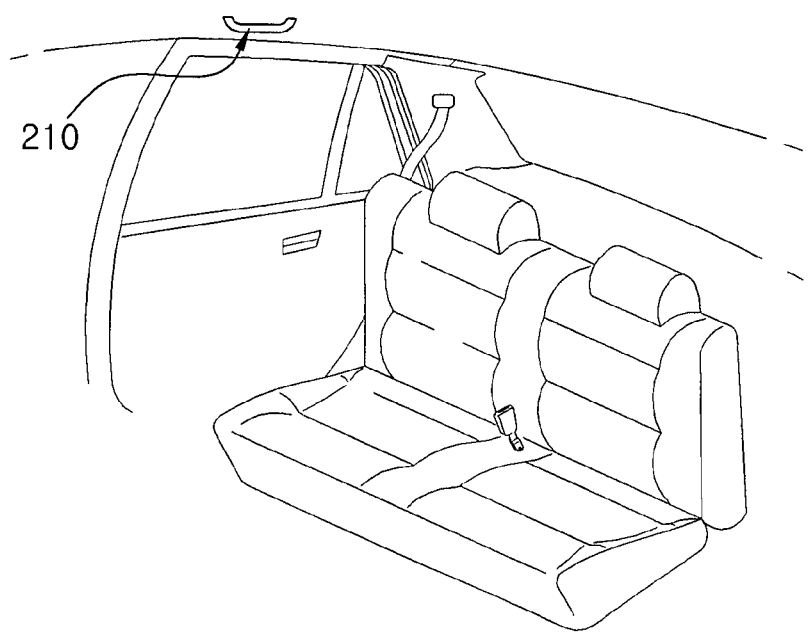
FIG. 5 is a perspective view schematically illustrating the interior of a vehicle in which an assist handle is installed.
Figure 6:
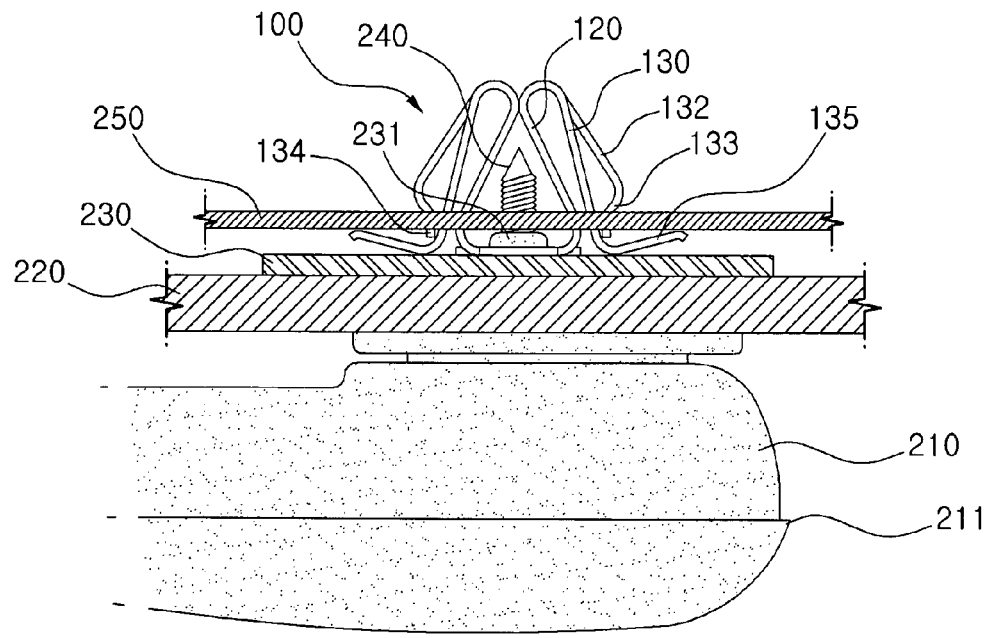
FIG. 6 is a view illustrating a fixing clip for an interior part of a vehicle in a used state according to an embodiment of the present invention.
Figure 7:
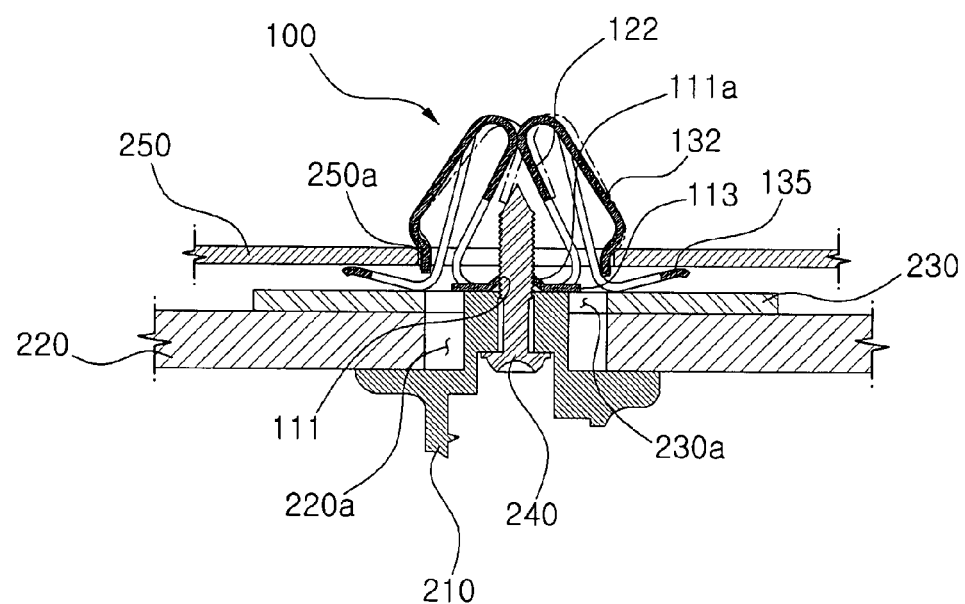
FIG. 7 is a view illustrating a fixing clip for an interior part of a vehicle in a coupled state according to an embodiment of the present invention.
Figure 8A:
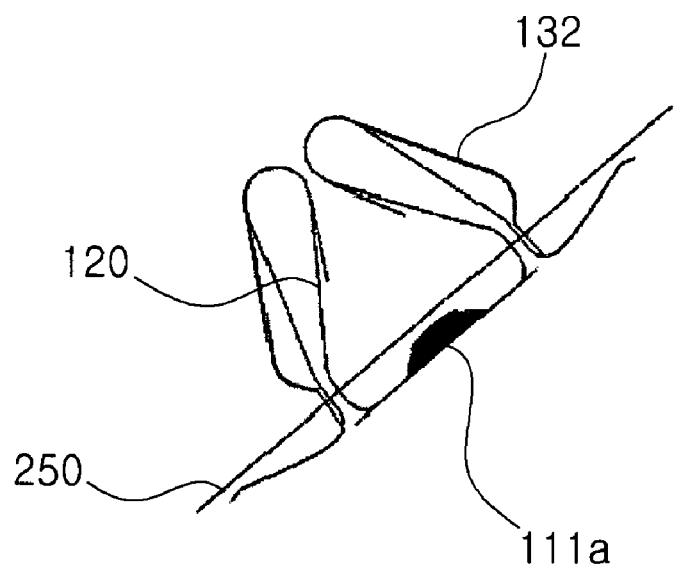
FIGS. 8A and 8B are views explaining the deformation of a clip when an external force is applied to the assist handle.
Figure 8B:
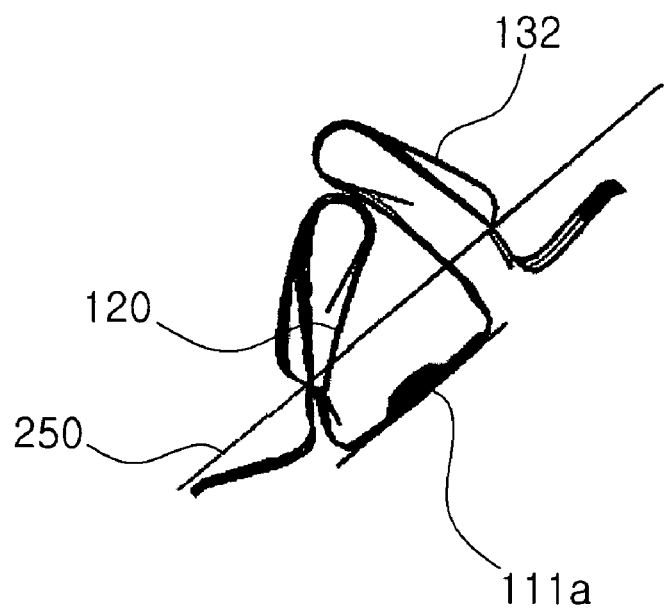

FIG. 1 is a perspective view of a conventional fixing clip for an interior part of a vehicle, FIG. 2 is a perspective view of a fixing clip for an interior part of a vehicle according to an embodiment of the present invention, and FIG. 3 is a partially cut-out view of FIG. 2. FIG. 4A is a side view of a fixing clip for an interior part of a vehicle according to an embodiment of the present invention, and FIG. 4B is a sectional view of a fixing clip for an interior part of a vehicle according to an embodiment of the present invention. FIG. 5 is a perspective view schematically illustrating the interior of a vehicle in which an assist handle is installed, FIG. 6 is a view illustrating a fixing clip for an interior part of a vehicle in a used state according to an embodiment of the present invention, and FIG. 7 is a view illustrating a fixing clip for an interior part of a vehicle in a coupled state according to an embodiment of the present invention. FIGS. 8A and 8B are views explaining the deformation of a clip when an external force is applied to the assist handle.

As illustrated in FIGS. 2 to 7, a fixing clip 100 for an interior part of a vehicle according to an embodiment of the present invention is secured to a headlining 220 by a screw 240 that penetrates the interior part and the headlining 220, and fixes the interior part to a mounting bracket 250 provided on a vehicle body. The fixing clip 100 includes a plate shaped bottom part 110, a pair of body parts 120 extending and being bent upwardly from both ends of the bottom part 110 to face each other on an upper side of the bottom part 110, and a pair of coupling parts 130 extending and being bent outwardly and downwardly from upper ends of the body parts 120.

Here, the bottom part 110 is a part that is in close contact with an upper surface of the interior part to be mounted inside the vehicle and is secured to the upper surface of the interior part by the screw 240. In the center thereof, a screw hole 111 into which the screw 240 is inserted, and at front and rear ends thereof, insertion holes 112 are provided.

In this case, in order to improve the insertion/securing and the fastening force of the screw 240, it is preferable that a bottom surface of an outer periphery of the screw hole 11 is concave, an upper surface thereof is projected upward to form a slant circular jaw 111a, and a groove 111b is formed on one side of the screw hole 111. That is, by making the insertion direction of the screw 240 and the outer projection direction of the screw hole 111 equal to each other, the insertion of the screw 240 is facilitated, and by the groove 111b formed on one side of the screw hole 111, the diameter of the screw hole 11 can be easily modified even if the diameter of the screw 240 is larger than the diameter of the screw hole 111. After the fastening of the screw 240, the circular jaw 111a of the screw hole 11 is caught by screw threads of the screw 240 to improve the fastening force of the screw.

In addition, a projection 231 provided on an upper surface of the interior part is fitted into the insertion hole 112. This insertion hole 112 guides the coupling direction of the interior part and the clip 100 so that they are accurately coupled to each other, and a projection 231 fitted into the insertion hole 112 serves to support the clip 100 so that the clip is not shaken. That is, the projection 231 prevents the clip 100 coupled to the interior part by the screw 240 from being rotated around the screw 240.

On the other hand, at central ends of the bottom part 110, ribs 113 in the form of a tetragonal piece are formed to project, and support the bottom part 110 to prevent the clip 100 from shaking.

The body parts 120 extend and are bent upwardly from both ends of the bottom part 110, and face each other on an upper side of the bottom part 110. The body part 120 is in the form of a trapezoid of which the width of the upper portion is narrower than that of the lower portion thereof.

Also, a space 121 is formed in the body part 120, and a deformation prevention piece 122 is formed in a body with the body part 120 to project from the central upper end to the lower end thereof. This deformation prevention piece 122 is to prevent the deformation of the body part 120 when an external force is applied to the clip 100. When the body part 120 is deformed, the deformation prevention piece 122 is hooked on the end portion of the screw 240 to prevent a further deformation of the body part 120, and thus the permanent deformation or damage of the clip 100 is prevented.

The coupling part 130 is formed to extend and to be bent outwardly and downwardly from the upper end of the body part 120. It is preferable that the coupling part 130 is in the form of a trapezoid that is equal to the whole shape of the body part 120.

In addition, a "U"-shaped cut portion 131 is formed in the respective coupling part 130, and an elastic wing part 132 in the form of a trapezoid is formed in a body with the coupling part 130 to extend from the central upper end to the lower end of the coupling part 130.

This elastic wing part 132 is somewhat open from the coupling unit 130 and is elastically biased to an outside. At the front end of the elastic wing part 132, an inwardly bent portion 133 and an outwardly bent portion 134 are formed. When the clip 100 is coupled to the mounting bracket 250, the inwardly bent portion 133 is pressingly supported by the upper side of the mounting bracket 250, and the outwardly bent portion 134 are pressingly supported by both side surfaces of a tetragonal clip insertion hole 250a provided in the mounting bracket 250, so that the clip 100 is firmly coupled to the mounting bracket 250.

In this case, in order to heighten the pressing force of the outwardly bent portion 134, it is preferable that both sides of the front end of the outwardly bent portion 134 remain to project, and a cut portion 134a is formed between the both sides of the front end of the outwardly bent portion 134.

In addition, the front end of the outwardly bent portion 134 projects to a lower portion of the mounting bracket 250 through the clip insertion hole 250a, and in the case of taking off the clip 100 from the mounting bracket 250, the front end of the outwardly bent portion 134 is pulled inwardly using equipment.

On the other hand, a flange 135 is formed at an end of the respective coupling part 130. This flange 135 is formed by outwardly bending the end portion of the coupling part 130 at the same height as the bottom part 110, and is elastically biased by the lower surface of the mounting bracket 250. The flange 135 serves to firmly couple the clip to the mounting bracket 250 together with the outwardly bent portion 134 and the inwardly bent portion 133.

Hereinafter, the mounting of an assist handle 210 provided on the headlining of a front or rear seat of a vehicle using the fixing clip 100 according to an embodiment of the present invention will be described with reference to FIGS. 6 and 7.

On both end portions of the assist handle 210, projections 231 that are inserted into the insertion holes 112 are provided, and a separable cover 211 is provided on one side of the assist handle 210 so as to fasten the screw 240 inside the assist handle 210.

A flat handle plate 230 is in close contact with the upper surface of the headlining 220, and a through-hole 230a, into which the screw 240 and the projection 231 are inserted, is provided in the handle plate 230.

Then, in order to arrange the screw hole 111 of the clip 110 and the through-hole 220a of the headlining 220 on the same axis, corresponding to the though-hole 230a of the handle plate 230 via the handle plate 230, the bottom portion 110 of the clip 100 becomes in close contact with the upper surface of the handle plate 230, the projection 231 is inserted into the insertion hole 112, and the upper surface of the headlining 220 becomes in close contact with the lower surface of the handle plate 230.

Then, the assist handle 210 is coupled to the clip 100 and is mounted on the headlining 220 by fastening the screw 240 through the through-hole 220a of the headlining 220, the through-hole 230a of the handle plate 230, and the screw hole 111 of the clip 100.

Such coupling is modularized around the headlining 220, and by inserting the clip 100 into the clip insertion hole 250a of the mounting bracket 250, the mounting of the assist handle 210 in the vehicle is completed.

In this case, since the width of the clip insertion hole 250a is smaller than the maximum width of the elastic wing part 132 of the clip 100, the elastic wing part 132 passes through the clip insertion hole 250a as being elastically pressed in the clip insertion process. Thereafter, the outwardly bent portion 134, which is open to an outside by an elastic restoring force, is pressingly supported by the upper surface of the mounting bracket 250 on both sides of the clip insertion hole 250a, and the inwardly bent portion 133 is pressingly supported by the upper surface of the mounting bracket 250 on both sides of the clip insertion hole 250a. The flange 135 is pressingly supported by the lower surface of the mounting bracket 250.

Accordingly, the clip 100 is firmly coupled to the mounting bracket 250, and thus is prevented from seceding from the clip insertion hole 250a due to the shaking of the vehicle or an unexpected external force being applied thereto. Then, the assist handle 210 is coupled to the mounting bracket 250 through the clip 100 to compete the mounting of the assist handle 210 on the headlining 220.

In addition, in the case of taking off the clip 100 from the mounting bracket 250, the front end of the inwardly bent portion 133, which projects to the lower portion of the clip insertion hole 250a, is pulled inwardly using equipment, and thus the maximum width of the elastic wing part 132 becomes smaller than the width of the clip insertion hole 250a to facilitate the take-off of the clip 100.

During the driving of the vehicle, a passenger holds the assist handle 210, and when the vehicle is shaken or in the case of a sudden start or stop of the vehicle, an external force is applied to the assist handle 210, and thus the clip 100 that is coupled to the assist handle 210 is deformed.

If the degree of deformation of the body part 120, which occurs due to the external force being applied to the clip 100, exceeds the elastic limit, the clip 100 cannot be restored to its original shape, but is permanently deformed or damaged.

FIGS. 8A and 8B are views explaining the deformation of a clip when an external force is applied to the assist handle.

Specifically, FIG. 8A shows the shape of the clip before the deformation occurs and FIG. 8B shows the shape of the clip after the deformation occurs. It is exemplified that the deformation occurs when the assist handle 210 is mounted so that the angle between a loop panel of the vehicle and the central axis of the clip is 30° in a state that the screw 240 is not fastened, and the take-off force is vertically and downwardly applied to the assist handle 210. Here, the slanting line crossing the clip indicates the mounting bracket 250.

However, as illustrated in FIG. 7, as the body part 120 of the clip 100 is deformed, the deformation prevention piece 122 becomes in contact with the end of the screw 122 to prevent a further deformation of the body part 120, and thus the permanent deformation or damage of the clip 100 is prevented.

In the embodiment of the present invention, it is exemplified that the clip is coupled to the assist handle as a part of the vehicle. However, it will be apparent that the clip according to the present invention can also be applied to the coupling of the sun-visor, room lamp, and so forth, which is coupled to the mounting bracket.

As described above, according to the present invention, the clip can firmly and easily mount/separate an interior part on/from the vehicle body with its deformation, damage, or unexpected seceding due to an external force prevented.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fixing clip for securing an interior part of a vehicle to a mounting bracket provided in a vehicle body, the fixing clip comprising:
   a bottom part provided with a screw hole through which the screw can be fastened to secure the fixing clip to the interior part of the vehicle;
   a pair of body parts extending and bent upwardly from both ends of the bottom part to face each other; and
   a pair of coupling parts extending and bent outwardly and downwardly from upper ends of the body parts for insertion into clip insertion holes provided on the mounting bracket to secure the fixing clip to the mounting bracket;
   wherein each of the body parts defines a space and includes a deformation prevention piece extending into the space for contacting the screw only upon deformation of the fixing clip to protect the fixing clip from damage.

2. The fixing clip of claim 1, wherein a cut portion is formed in the coupling part, and an elastic wing part that is elastically biased to an outside is formed with the coupling part.

3. The fixing clip of claim 2, wherein an inwardly bent portion and an outwardly bent portion are formed at a front end of the elastic wing part, and a front end of the outwardly bent portion is projected downward from the clip insertion hole.

4. The fixing clip of claim 1, wherein at an end of the respective coupling part, a flange which extends to be bent to an outside and is elastically biased to a lower surface of the mounting bracket is formed.

5. The fixing clip of claim 1, wherein the body parts are movable between a first position in which the deformation prevention pieces do not contact the screw, and a second position in which one of the deformation prevention pieces contacts the screw to protect the fixing clip from damage upon deformation of the fixing clip.

6. A fixing clip for securing an interior part of a vehicle to a mounting bracket provided in a vehicle body, the fixing clip comprising:
   a bottom part provided with a screw hole through which the screw can be fastened to secure the fixing clip to the interior part of the vehicle;

a pair of body parts extending and bent upwardly from both ends of the bottom part to face each other; and a pair of coupling parts extending and bent outwardly and downwardly from upper ends of the body parts for insertion into clip insertion holes provided on the mounting bracket to secure the fixing clip to the mounting bracket;

wherein each of the body parts defines a space and includes a deformation prevention piece extending into the space, and wherein the body parts are flexible and movable between a first position in which the deformation prevention pieces do not contact the screw, and a second position in which one of the deformation prevention pieces contacts the screw upon deformation of the fixing clip to protect the fixing clip from damage.

* * * * *